UNITED STATES PATENT OFFICE.

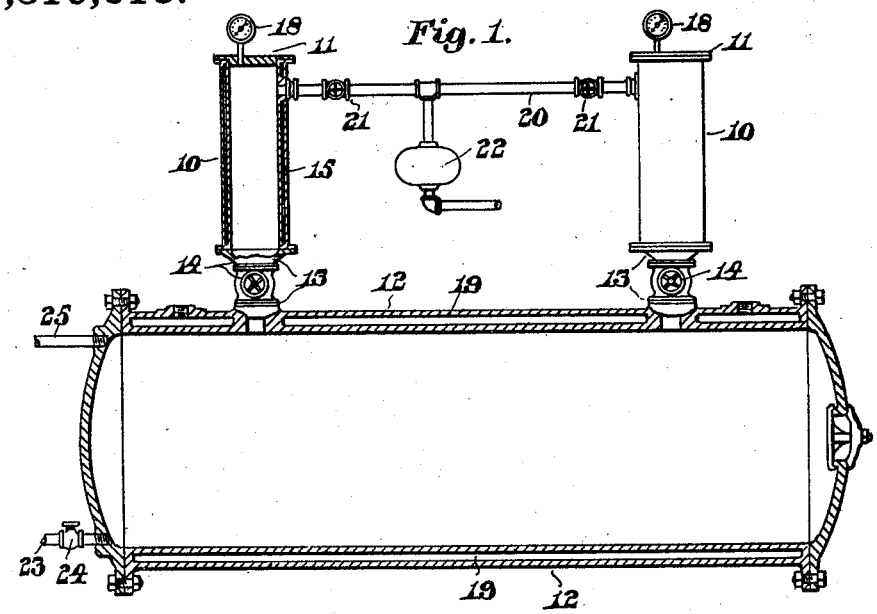

HANS RICHARD HAERTEL, OF FRANKLIN, MASSACHUSETTS.

PROCESS FOR RECLAIMING RUBBER.

1,310,013.        Specification of Letters Patent.        Patented July 15, 1919.

Application filed December 23, 1918. Serial No. 268,079.

*To all whom it may concern:*

Be it known that I, HANS RICHARD HAERTEL, a subject of the Government of Germany, and a resident of Franklin, in the county of Norfolk and Commonwealth of Massachusetts, have invented certain new and useful Improvements in Processes for Reclaiming Rubber, of which the following is a specification.

This invention relates to processes for reclaiming waste rubber and has for its object the provision of a simple and efficient process by which the rubber may be reclaimed in a plastic condition.

The invention consists primarily in swelling the rubber while under pressure and then causing the rubber to sponge out by suddenly releasing all outside pressure thereon.

Various liquids are adapted to swell the rubber, as for instance, ether, acetone, benzene, water, etc.

If any of these liquids or liquids similar thereto, are permitted to pass into the rubber, it will be swelled.

If the rubber is then exposed to the air, any of these liquids will filter outwardly and then evaporate.

By soaking vulcanized rubber in liquids the rubber may be swelled and then again shrunk when the liquids have been removed therefrom.

In order to accomplish the object of the present invention, the waste rubber is first expanded by means of any selected liquids of comparatively low boiling point, which liquids need not necessarily be solvents of rubber.

The swelled or expanded rubber, while in a closed vessel and under pressure, is subjected to the required degree of heat.

This heat should never reach a temperature sufficient to produce vulcanization for it is well-known that in all rubber there is generally some free sulfur which in the usual way of reclaiming rubber tends first to a higher vulcanization of the waste rubber.

Neither should the temperature be brought to the point of decomposition or destruction. In other words, the temperature should never exceed 130° C.

Now, if the rubber is subjected to the action of carbon bisulfid which has a boiling point 46° C. or acetone which has a boiling point 56° C. and these are brought to a temperature of about 100° C. a pressure of over 500 lbs. per square inch will result and the interior rubber will be expanded but at this time the rubber is confined in a closed vessel and is subjected to outside pressure.

Should the rubber at this time be delivered suddenly to a receptacle where subjected to no outside pressure, the excessive interior pressure would stretch it beyond its elastic limit and an explosion would occur.

The change must be sudden or otherwise the infiltered liquid might have time to filter outwardly again without disruption.

By making the sudden change in pressure, the rubber will explode and sponge so that it may be attacked by a suitable rubber solvent. Any cotton, filler, etc., which might be in the solution may be removed therefrom by straining, filtering or in any desired manner.

This recovery of all the textile fibers such as cotton, hemp, etc., is very important for all of these materials may be used in shoe soles and similar articles made of rubber and fiber.

All the liquids used are recovered without any change in their properties and may be used again.

When the unchanged rubber is reclaimed by the process herein described, no washing or drying is necessary.

In carrying out the process an apparatus may be used similar to that shown in the drawings of which—

The figure represents a vertical section of the apparatus.

In the drawing 10, 10 are cylinders provided with covers 11, 11, these cylinders 10, 10 both being connected to an explosion chamber 12 by means of pipes 13 each having a valve 14 therein. Each cylinder 10 is provided with a steam jacket 15. Each cover 11 has mounted thereon a gage 18 to indicate the pressure within the cylinders 10.

The explosion chamber 12 is provided with a steam jacket 19.

The cylinders 10 are connected by means of a pipe 20 having valves 21, 21 therein, one of which is adjacent to each cylinder 10.

This pipe 20 is connected to a pump 22 by means of which any degree of pressure may be maintained in the cylinders 10.

From the explosion chamber 12 extends a pipe 23 having a valve 24 therein. This pipe 23 leads to any well-known form of condenser.

The condenser is also connected to the explosion chamber 12 by means of a pipe 25 communicating with said explosion chamber 12 near the top thereof.

Crude rubber is partly soluble, and partly semi-soluble and a solution of crude rubber will not pass through a diaphragm of fine structure, as for instance, parchment.

Vulcanized rubber is insoluble in any known solvent at a temperature below the point where decomposition or destructive distillation begins.

To reclaim the interior gum in an unchanged condition, the vulcanized waste rubber is placed in the cylinders 10, which are closed at the top by the caps 11, and communicate at the bottom with an explosion chamber 12, by means of the pipes 13.

Each pipe 13, is provided with a valve 14, which is normally closed.

Each cylinder 10, is provided with a steam jacket 15, the steam in which provides the necessary heat for the contents of the cylinder.

The selected liquid or solvent, is placed within the cylinder 10, with the waste rubber and the entire contents of the cylinders are then subjected to the heat of the steam in the steam jackets 15.

The heating is continued until the contents of the cylinder reach a temperature of about 100° C.

If the liquids used have a low boiling point, as for instance, approximately 50° C. as soon as the heat in the cylinders 10, has exceeded this temperature and the liquids have penetrated the rubber, said rubber will begin to swell and stretch.

As the mass of rubber under the action of the liquids and heat expands, an outside pressure thereon will be created in each cylinder which will so offset the inside pressure as to prevent disruption.

The pressure within the cylinders 10, will at all times be indicated by the gages 18.

When the contents of the cylinders 10, have reached the required temperature and a predetermined pressure has been reached, the valves 14, will be opened and the swelled rubber will be delivered through the pipes 13, into the explosion chamber 12, where there is heat but no outside pressure.

As a consequence of the presence of continued heat in the chamber 12, the rubber interiors will continue to swell or expand and as the infiltered liquids cannot quickly pass through the rubber 17, it will explode and leave the rubber in a disrupted spongy mass.

This explosion of the rubber is due to the absence of outside pressure as the interior rubber continues to swell and expand when suddenly delivered to the chamber 12.

The heat for the explosion chamber 12 is provided for by means of steam passing through the steam jacket 19 surrounding said chamber.

If desired, the pressure in the cylinders 10, may be increased by forcing the liquids or solvents into said cylinders under pressure through the pipes 20, each provided with a valve 21 and communicating with a pump 22.

Pressure in the cylinders 10, may also be secured by using therein non-solvents such as acetone.

It is preferable to select non-inflammable solvents in order to prevent explosions which otherwise might be caused by sparks of static electricity.

One end of the explosion chamber 12, is provided with a manhole through which the reclaimed rubber may be withdrawn from said chamber.

The tank or chamber 12, is also provided with an outlet pipe 23, through which the liquids may be withdrawn from said chamber when the valve 24, has been opened.

This pipe 23, leads to a condenser and another pipe 25 also leads to said condenser to carry away any gases which may have been generated by the solvents used.

Free sulfur, filler, etc., may be reclaimed after the explosions have taken place by straining, filtering, floating or other suitable means.

The rubber is ready for reuse in compounding.

It is believed that the operation and many advantages of the invention will be readily understood from the foregoing description.

Having thus described my invention, I claim:

1. The process of reclaiming vulcanized rubber consisting in swelling the rubber while under pressure and then releasing the pressure thereon suddenly.

2. The process of reclaiming vulcanized rubber consisting in subjecting the rubber while under pressure to the action of liquids which will swell the rubber and then releasing the pressure thereon suddenly.

3. The process of reclaiming vulcanized rubber consisting in subjecting the rubber while under pressure to the action of liquids of comparatively low boiling point which will swell the rubber and then releasing the pressure thereon suddenly.

4. The process of reclaiming vulcanized rubber consisting in subjecting the rubber to the action of liquids which will swell the rubber, then while under pressure heating the rubber and then releasing the pressure thereon suddenly.

5. The process of reclaiming vulcanized rubber consisting in subjecting the rubber to the action of liquids which will swell the rubber, then while under pressure heating the rubber to a temperature of about 100° C. and then releasing the pressure thereon suddenly.

6. The process of reclaiming vulcanized rubber consisting in subjecting the rubber to the action of a liquid having a comparatively low boiling point, as for instance carbon bisulfid, and heating the same under pressure to a temperature of about 100° C. and then suddenly releasing the outside pressure thereon.

7. The process of reclaiming vulcanized rubber consisting in swelling the gum while under pressure in a closed vessel and then suddenly ejecting the swelled rubber into a receptacle having no pressure.

8. The process of reclaiming vulcanized rubber consisting in subjecting the gum to the action of liquids to swell the gum; confining the swelled rubber in a closed receptacle under pressure and heating said rubber to 100° C. and then suddenly releasing the outside pressure on said rubber.

Signed by me at 4 Post Office Square, Boston, Mass., this 21st day of December, 1918.

HANS RICHARD HAERTEL.

Witnesses:
WALTER E. LOMBARD,
EDWARD F. ALLEN.

Copies of this patent may be obtained for five cents each, by addressing the "Commissioner of Patents, Washington, D. C."